April 10, 1934.  R. B. OTWELL  1,954,424
PLANTING PLAN AND MULCH
Filed April 22, 1933
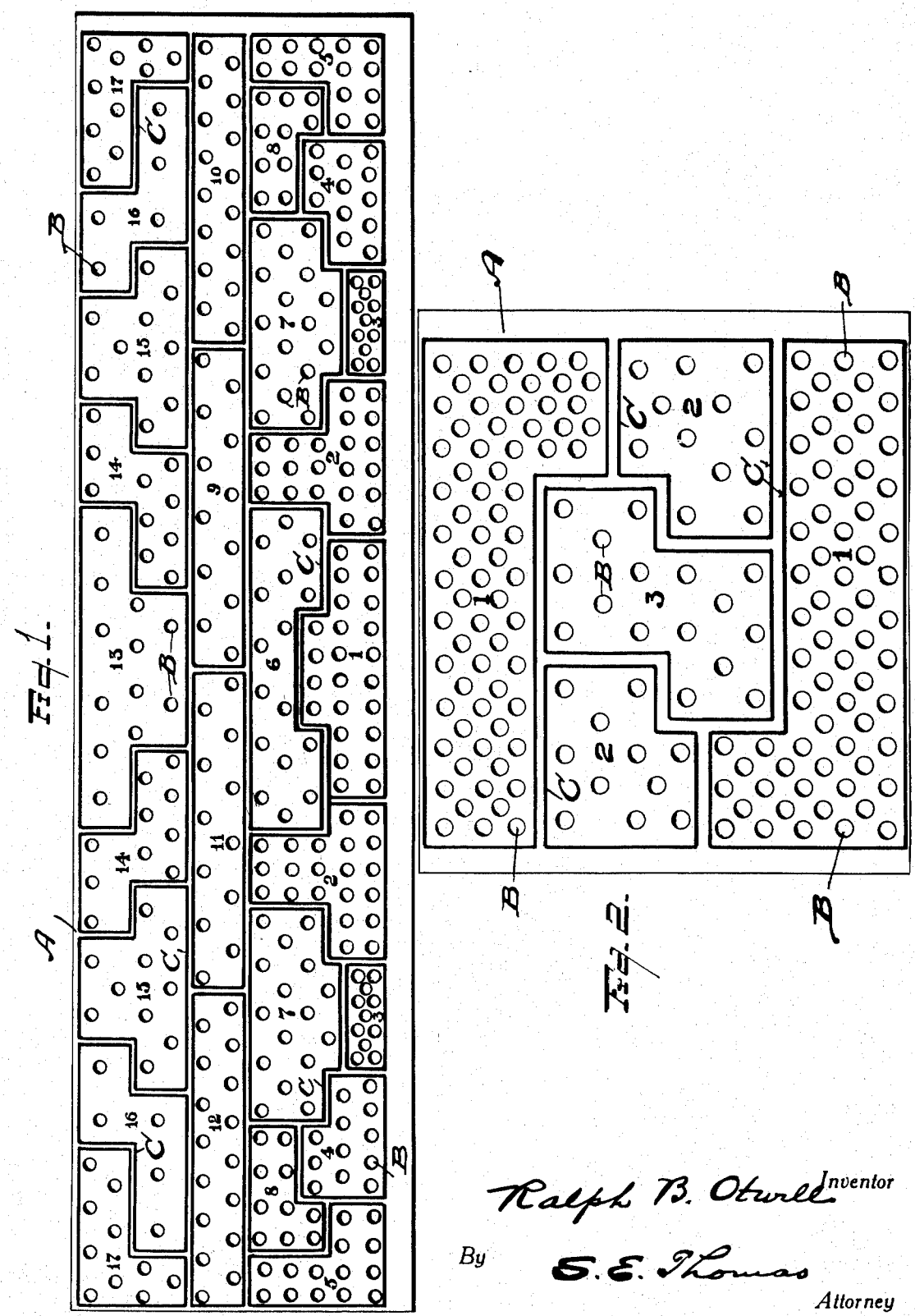
Ralph B. Otwell Inventor
By S. E. Thomas
Attorney Patented Apr. 10, 1934

1,954,424

UNITED STATES PATENT OFFICE 1,954,424

PLANTING PLAN AND MULCH

Ralph B. Otwell, Detroit, Mich.

Application April 22, 1933, Serial No. 667,321

3 Claims. (Cl. 47—9)

My invention relates to a method of planting seeds, small growing plants, bulbs or the like, according to a predetermined plan, printed upon mulch-paper for determining the planting location of each plant of every group of like color or character,—arbitrarily segregated and arranged in relation to other seeds, living plants, and bulbs, inclosed within segregated areas,—the object being to produce an effective and harmonious mass combination of color when the plants blossom or reach maturity.

This planting plan is designed as an improvement on that shown and described in Patent No. 1,846,274, issued to me February 23rd, 1932.

The earlier invention comprises a strip of mulching paper punched with a plurality of openings, surrounding which is printed certain informative data, adjacent the several openings to indicate the particular seed, bulb, or the like to be bedded in the soil beneath the respective openings.

In the present invention, a mulching strip of fabric is provided on which is printed a plurality of spaced fixed areas of suitable interlocking form, inclosing a multiple number of openings in each area, through which plants of like character, like color, or harmonious effect, may be bedded in the soil upon which the mulch fabric rests,—each interlocking area being suitably indexed to correspond with like indices on seed packages, small plants, or bulbs inclosed in numbered envelopes, whereby the gardener may readily and respectively determine their proposed locations by bedding them in the soil through the correspondingly indexed openings in the mulching strip,—thereby carrying into effect a predetermined effective and harmonious planting plan.

One of the advantages of a planting scheme embodying a plurality of segregated areas for the respective grouping of like plants, or color effects, is that it provides the gardener with a definite dependable plan, which if necessary he may readily divide to meet the conditions surrounding various locations, requiring different treatment to insure an effective planting. For example, if the location of the proposed flower bed is such that a relatively large area is to be bedded with certain plants or flowers to produce a desired massed effect, the gardener may detach portions of the planting plan along the lines bounding different segregated areas, that they may be connected with interlocking portions grouped in other,—or adjacent relation, thereby providing an increased area of plants of like character or color. The construction and arrangement of the boundary lines of the segregated portions is such that they are adapted to readily interlock with contiguous, or other boundary or marginal portions of the strip. So also, when the conditions are such that a flower bed of greater width than the planting plan is required for any particular location, a second strip adapted to interlock with a like strip may be joined wherever it is necessary to enlarge the bed, in order that the flowers planted upon reaching maturity may present a united and harmonious effect.

When bedding seed, or plants through the respective openings, a suitable balanced fertilizer may be deposited through the openings of the mulch paper to receive the plants, thereby hastening the growth, vigor and development of the plants.

It should also be noted that the mulching strip will have a deterrent effect on the growth of weeds, while serving to retain the moisture surrounding the plants for their proper growth.

With the foregoing and other objects in view which will appear as the description proceeds, the invention further resides in the combination and arrangement of such details as will be hereinafter described and claimed, it being understood that changes may be made in the precise embodiment of the invention herein disclosed without departing from the spirit of the same.

In the drawing accompanying this specification:

Figure 1 is a plan view of a mulching strip of fabric indicating a plurality of bounded interlocking segregated areas, within which are respectively grouped a plural number of openings through which seeds, plants, or the like may be bedded in the soil, beneath the openings in the strip, on which the mulching fabric is laid.

Figure 2 is a modification of the mulching strip, shown in the preceding figure, indicating a variation in the form of the interlocking portions of the mulching strip surrounding the respective groups of openings in its segregated areas, said areas being numbered or otherwise indexed to conform to a corresponding indicia printed upon packages of seeds, individually tagged plants, or envelopes containing bulbs,—to be bedded in the soil through the respective openings.

Referring now to the reference characters placed upon the drawing.

A denotes a strip of mulching fabric provided with a plurality of openings B, exposing portions of a previously prepared seed bed when laid upon the ground in which the seed, plants or the like are to be bedded. The openings B, are grouped and segregated from other like groups by interlocking scored boundary lines C, whereby the gardener when desiring to change the arrangement of the respective groupings may divide the mulching strip or plan along the boundary lines dividing the segregated groups of openings.

The boundary lines are adapted to interlock with the boundary lines of other portions of the strip when cut to receive the interlocking portion previously separated therefrom.

Each segregated area is numbered for example: 1, 2, 3, 4, etc.,—or they may be otherwise indexed to correspond with a like number or indicia printed upon packages or envelopes containing the plants or seeds designed to be embedded in the soil through the opening in the strip of the respective segregated areas.

As indicated, the purpose of this invention is to provide a planting plat or plan, printed on mulching paper, provided with a plurality of grouped openings, the respective groups of openings being separated by boundary lines defining an interlocking contour, whereby the gardener may adapt the plan to different locations or conditions by separating portions of the strip along the line bounding the contour of any group of openings that it may be transferred and interlocked with other portions of the strip to provide the necessary massed effect at any particular location,—each segregated group being numbered to correspond with numbers employed on the seed packages, plants, or envelopes containing bulbs to be planted;—thus the gardener may readily select the seeds or plants for each particular group and thereby insure the desired harmony of color, necessary for an effective planting.

The name of the plants or flowers may also if desired be printed within the boundary line surrounding each group of plants, with data concerning the care and time for planting included, if desired.

Having thus described my invention, what I claim is:

1. A pattern planting strip having a plurality of groups of openings bounded and separated by interlocking scored lines of demarcation, along which the strip may be divided, whereby portions of the strip may be shifted to interlock with other portions of the strip as may be desired.

2. A pattern planting strip of mulching fabric having a plurality of groups of openings through the strip, bounded by interlocking scored lines of demarcation separating the groups of openings of each area; means for indexing each area or group to correspond with an index printed upon plant and seed packages, whereby seeds and plants having a corresponding index may be bedded in the soil through the openings on which the plan is laid.

3. A combined interlocking planting plan comprising a strip of mulching fabric, having a plural number of openings arranged in segregated groups; an interlocking scored border line bounding each group of openings, adapted when separated on the line from the body of the strip to interlock with other interlocking portions of the strip, whereby the size and form of said planting area may be altered, enlarged, or reduced and thereby adapted for different locations; and an indexing means for each segregated group of openings, adapted to correspond with the respective indicia of seed packages, plant wrappers, or bulb envelopes, whereby certain seeds, plants, or bulbs, of predetermined kind may be readily bedded in the soil through the respective openings in the planting plan and mulching strip.

RALPH B. OTWELL.